Patented Jan. 11, 1938

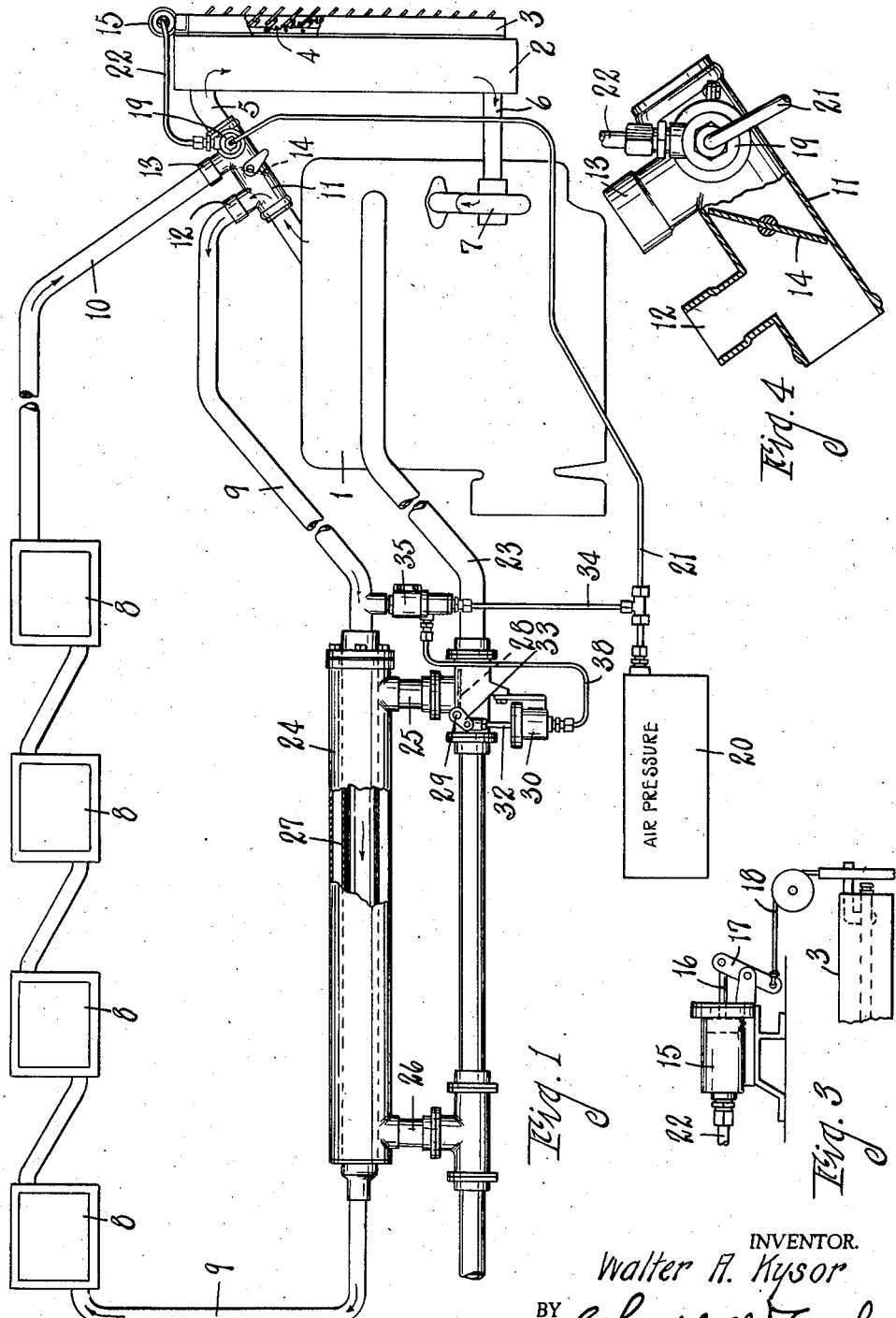

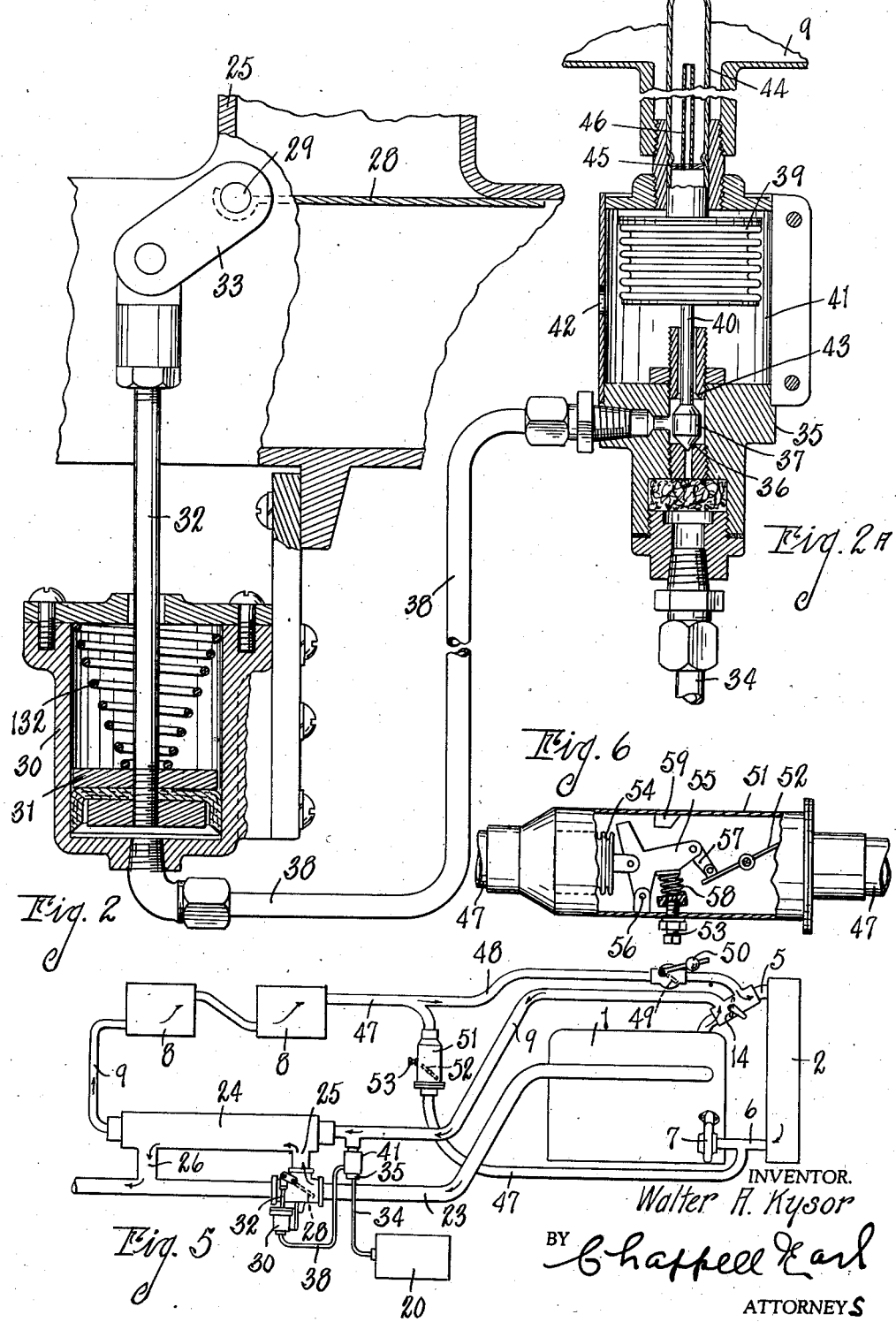

2,105,193

UNITED STATES PATENT OFFICE 2,105,193

ENGINE COOLING AND HEATING MEANS FOR MOTOR VEHICLES

Walter A. Kysor, Cadillac, Mich.

Application June 17, 1935, Serial No. 26,947

20 Claims. (Cl. 237—12.3)

The main objects of this invention are:

First, to provide an effective heating means for internal combustion engines, driven busses, cars and the like and at the same time an efficient cooling water control means.

Second, to provide means having the advantages above outlined which are effective through a wide range of atmospheric conditions and temperatures.

Third, to provide means of the character indicated which is automatic in operation.

Fourth, to provide an improved heating system for motor vehicles which is effective under widely varying temperatures for maintaining a substantially uniform temperature.

Fifth, to provide a heating means for motor vehicles having these advantages which provides a maximum of safety.

Sixth, to provide a means for heating motor vehicles and cooling the engine having the advantages indicated which is simple and economical in parts and easily installed.

Objects relating to details and economies of my invention will appear from the description to follow. The invention is defined and pointed out in the claims.

A structure which is a preferred embodiment of my invention is illustrated in the accompanying drawings, in which:

Fig. 1 is a conventionalized diagrammatic view of a combined water cooled internal combustion engine cooling system and vehicle heating system embodying the features of my invention.

Fig. 2 is an enlarged fragmentary view partially in vertical section showing details of the exhaust heater unit and its pneumatic operating engine.

Fig. 2A is a fragmentary view mainly in vertical section of the thermostatic control valve for the pneumatic engine shown in Fig. 2.

Fig. 3 is a fragmentary front elevation illustrating the pneumatic operating engine for the radiator shutter unit, this being shown mainly in conventional form.

Fig. 4 is an enlarged fragmentary view partially in section showing the details of the supply connection for the engine water jacket to the radiator.

Fig. 5 is a diagrammatic conventionalized illustration of a modified form or embodiment of my invention.

Fig. 6 is an enlarged fragmentary view partially in section illustrating details of the thermostatic circulation control valve of the embodiment shown in Fig. 5.

Referring to the drawings, 1 represents an internal combustion engine provided with a cooling water jacket which may be of the conventionalized type and therefore no detail is shown herein.

The radiator is conventionally shown at 2 and is provided with a shutter unit designated generally by the numeral 3 and adapted to be normally opened by means of a spring or springs 4; that is, when the temperature of the cooling water reaches a predetermined high point the shutters or louvers are opened by the springs, an automatic means being provided for closing the shutters when the cooling water temperature drops to a predetermined point and under conditions which will be made clear as the description proceeds.

The supply connection for the engine to the radiator is indicated at 5 and the return connection at 6. The return connection is provided with a circulating pump conventionally shown at 7. The heating system in the embodiment illustrated comprises a plurality of heat transfer units 8 connected in series and provided with a feed pipe or conduit 9 and the return pipe or conduit 10. For convenience, the supply connection 5 of the radiator is provided with a coupling unit 11 having a nipple 12 to which the pipe 9 is connected and a nipple 13 to which the pipe 10 is connected. Between these nipples the coupling member 11 is provided with a valve 14 adapted to be controlled and when this valve is open, as in summer, the heating system is by-passed; that is, water flows directly from the engine to the top of the radiator, but when this valve is closed, the water circulates from the engine through the heating system and from thence to the radiator and is returned to the engine.

The shutters are controlled by the pneumatic engine designated generally by the numeral 15, the plunger of which is provided with a plunger rod 16 connected to the lever 17 and this in turn is connected to the operating bar of the shutters by means of the cable 18. This pneumatic engine is preferably the same as that of a second pneumatic engine adapted for controlling the exhaust heater and that engine is shown in detail as is also its thermostatic control valve.

The air engine 15 is controlled by a thermostatic valve unit 19 connected to the air supply reservoir 20 by means of the pipe 21. The delivery from the valve to the air engine 15 is through the pipe 22. The thermostatic element of this valve is disposed so that it is subject to the temperature of the return water of the heating system or when the valve 14 is open to the temperature of the water as it leaves the engine. The valve unit is, as stated, the same as that for controlling the heating unit to be described.

The internal combustion engine is provided with an exhaust pipe 23. The heating drum 24 is connected to the exhaust pipe 23 through the feed connection 25 at the front end of the drum and the exhaust or delivery connection 26 at the return end of the drum. Interposed in the feed pipe 9 and disposed concentrically within the heating drum is a heating tube or flue 27. The delvery of exhaust gases to the heating drum is controlled by the flap valve 28 pivoted at 29 so that it may be swung to closed position across the mouth of the connection 25, or when fully opened swings across the exhaust pipe directing the products of combustion through the heating drum. This valve is automatically controlled by means of an air or pneumatic engine consisting of the cylinder 30 provided with a plunger 31 connected by the plunger rod 32 to the arm 33 on the valve stem 29. The plunger is provided with a return spring 132. The air supply reservoir is connected by the pipe 34 to the valve casing 35 which is provided with an inwardly facing seat 36 for the valve 37. The valve casing is connected above the seat to the bottom or inner end of the cylinder 30 by the conduit 38 so that when the valve is open the air supply is admitted to the cylinder and the valve is actuated.

The valve 37 is operatively associated with a thermostatic device consisting of the bellows 39 cooperating with the stem 40 of the valve, this bellows being arranged in the housing 41 having a vent opening 42. The valve is a double seating valve and when in open position coacts with the seat 43 preventing the escape of air through the housing and this vent. When, however, the valve is seated as occurs when the bellows is expanded, the air from the cylinder can escape through the valve casing round the stem and out of this vent 42. The thermostatic element is provided with a fluid tube 44 adapted to receive some easily expansible fluid and this tube projects into the conduit 9 so as to be subject to the water flowing from the engine to the heat exchange units. The tube is provided with a port or opening 45 from which a tube 46 projects outwardly within the tube 44. The purpose of this tube 46 is to provide the small amount of air which is held in tube 44 together with the liquid from passing from tube 44 to the bellows 39 no matter in what position the unit may be positioned or occupies.

This device is very easily installed and is highly sensitive. With this arrangement of parts, when the temperature of the cooling water is below a predetermined point, the shutters of the radiator remain closed as stated so that a maximum of heat is delivered to the heaters or the heat exchange units. However, should the temperature then continue below the desired point, the exhaust heater thermostatic device described will open the valve 37 allowing air from the pressure tank to pass to the pneumatic engine controlling the exhaust control valve 28 and this valve will be opened so that the circulating water will receive the additional heat from the exhaust heating unit. As soon as it reaches a predetermined point, the valve 28 will be closed and if the temperature then reaches beyond the desired point for heating purposes, the shutters will be opened through the mechanism described. As stated, the unit 19 is preferably the same as the thermostatic unit described.

With this arrangement of parts, a highly efficient control is provided for the engine cooling water, this being especially desirable for busses which operate under conditions which render it very difficult to maintain a uniform cooling of the water. The engine, however, will be very accurately controlled in this way which adds greatly to its efficiency and durability and minimizes gas consumption and also uniform and satisfactory temperatures may be maintained in the vehicle.

In the modification or adaptation of my invention shown in Fig. 5, the return pipe 47 corresponding to the return pipe 10 is connected to the return pipe 6 of the radiator. It might otherwise be connected to the lower part of the water jacket of the engine 1. A branch or by-pass return connection 48 connects the return pipes 47 to the radiator supply connection 5. This connection 48 is provided with a valve 49 normally closed by gravity, a closing weight being indicated at 50. A thermostatic valve unit 51 is interposed in the return connection 47 at the rear of the connection of the pipe 48. This valve unit comprises a suitable casing having a valve 52 therein controlled by the thermostatic element 54, that illustrated being of the bellows type. The thermostatic element is connected to the lever 55 pivoted at 56 and connected to the valve by means of the link 57. A spring 58 acts to urge the valve toward open position, this spring being adjusted by means of the screw 53 through which the unit is adjusted to control the temperature of the water or, in other words, to adjust the thermostatic valve unit.

In practice, the valve is not completely closed by the thermostatic unit but is only partially closed so that only a portion of the water is directed through the by-pass or branch connection 48 to the top of the radiator. This enables a very accurate controlling of the water temperatures of the engine. When the valve 52 is partially closed the pressure of the water in the system will open the valve 49 which is normally closed, so that when the temperature of the water in the system is below a predetermined point, it circulates through the engine only but when it exceeds the predetermined point, part of it at least is circulated through the cooling radiator.

A booster unit such as has been previously described is also employed in this embodiment and as I prefer to use the same mechanism it is not again detailed.

While I prefer to use the embodiment shown in Fig. 1 as I believe that a slightly more accurate control may be had of engine temperatures, the control of which is an important feature of my invention, the embodiment of Fig. 5 is satisfactory and is desirable for use where the radiator is not equipped with shutters or louvers and it is not very practical to so equip it.

I have illustrated and described two embodiments of my invention. While others are possible, I believe the disclosures made will enable those skilled in the art to embody or adapt my improvements as may be desired.

Having thus described my invention, what I claim as new and desire to secure by Letters Patent, is:

1. The combination with a water cooled internal combustion engine provided with an exhaust pipe and with a cooling water controlling system including a radiator and a heating system, the radiator being provided with a shutter unit and having supply and return connections to the engine, the return connection including a circulating pump, the heating system including a heat transfer unit and feed and return connections therefor to the supply connection of said radiator, there being a manually controlled valve between said feed and return connections so that when such valve is closed the engine cooling water is by-passed to the heating system, a supply of air under pressure, means for controlling said shutter unit including a pneumatic engine connected to said air supply, a thermostatically actuated control valve between said pneumatic engine and said air supply, the thermostatic element of which is disposed in said radiator supply connection so that it is subject to the temperature of the return water of said heating system, said thermostatically actuated valve admitting air from said supply to said pneumatic engine when the temperature of said return water falls below a predetermined point whereby said pneumatic engine is actuated to close the shutter unit, an exhaust heating drum operatively associated with said feed connection of said heating system, supply and discharge connections for said heating drum to said exhaust pipe, a valve controlling said heating drum supply connection adapted when open to direct products of combustion to the drum, a pneumatic engine operatively associated with said heating drum control valve and connected to said air supply, and a thermostatically actuated control valve between said second pneumatic engine and said air supply including a thermostatic element subject to the temperature of the feed water in the heating system in advance of said heating drum, said last named thermostatically actuated control valve admitting air to said second pneumatic engine when the temperature of the feed water falls below a predetermined point whereby said second pneumatic engine opens said heating drum control valve.

2. The combination with a water cooled internal combustion engine provided with an exhaust pipe and with a cooling water controlling system including a radiator and a heating system, the radiator being provided with a shutter unit and having supply and return connections to the engine, the heating system including a heat transfer unit and feed and return connections therefor to the engine and radiator respectively, a supply of air under pressure, means for controlling said shutter unit including a pneumatic engine connected to said air supply, a thermostatically actuated control valve between said pneumatic engine and said air supply, the thermostatic element of which is subject to the temperature of the return water of said heating system, said thermostatically actuated valve admitting air from said supply to said pneumatic engine when the temperature of said return water falls below a predetermined point whereby said pneumatic engine is actuated to close the shutter unit, an exhaust heating drum operatively associated with said feed connection of said heating system, supply and discharge connections for said heating drum to said exhaust pipe, a valve controlling said heating drum supply connection adapted when open to direct products of combustion to the drum, a pneumatic engine operatively associated with said heating drum control valve and connected to said air supply, and a thermostatically actuated control valve between said second pneumatic engine and said air supply including a thermostatic element subject to the temperature of the feed water in the heating system in advance of said heating drum, said last named thermostatically actuated control valve admitting air to said second pneumatic engine when the temperature of the feed water falls below a predetermined point whereby said second pneumatic engine opens said heating drum control valve.

3. The combination with a water cooled internal combustion engine provided with an exhaust pipe and with a cooling water controlling system including a radiator and a heating system, the radiator being provided with a shutter unit and having supply and return connections to the engine, the return connection including a circulating pump, the heating system including a heat transfer unit and feed and return connections therefor to the supply connection of said radiator, there being a manually controlled valve between said feed and return connections so that when such valve is closed the engine cooling water is by-passed to the heating system, means for controlling said shutter unit including a thermostatic unit subject to the temperature of the return water of said heating system, said controlling means closing said shutter unit when the temperature of said return water falls below a predetermined point, an exhaust heating drum operatively associated with said feed connection of said heating system, a supply connection for said heating drum to said exhaust pipe, a valve controlling said heating drum supply connection adapted when open to direct products of combustion to the drum, and means for controlling said heating drum valve including a thermostatic unit subject to the water in the heating system feed connection in advance of said heating drum, said last named controlling means opening said heating drum supply valve when the temperature of the water at said last named thermostatic unit falls below a predetermined point.

4. The combination with a water cooled internal combustion engine provided with an exhaust pipe and with a cooling water controlling system including a radiator and a heating system, the radiator being provided with a shutter unit and having supply and return connections to the engine, the heating system including a heat transfer unit and feed and return connections therefor to the engine and radiator respectively, means for controlling said shutter unit including a thermostatic unit subject to the temperature of the return water of said heating system, said controlling means closing said shutter unit when the temperature of said return water falls below a predetermined point, an exhaust heating drum operatively associated with said feed connection of said heating system, a supply connection for said heating drum to said exhaust pipe, a valve controlling said heating drum supply connection adapted when open to direct products of combustion to the drum, and means for controlling said heating drum valve including a thermostatic unit subject to the temperature of the water in the heating system feed connection in advance of said heating drum, said last named controlling means opening said heating drum supply valve when the temperature of the water at said last named thermostatic unit falls below a predetermined point.

5. The combination with a water cooled internal combustion engine provided with an exhaust pipe and with a cooling water controlling system including a radiator and a heating system, the radiator being provided with a shutter unit and having supply and return connections to the engine, the return connection including a circulating pump, the heating system including a heat transfer unit and feed and return connections therefor to the supply connection of said radiator, there being a manually controlled valve between said feed and return connections so that when such valve is closed the engine cooling water is by-passed to the heating system, and means for controlling said shutter unit including a thermostatic unit subject to the temperature of the return water of said heating system, said controlling means closing said shutter unit when the temperature of the water at said thermostatic unit falls below a predetermined point.

6. The combination with a water cooled internal combustion engine provided with an exhaust pipe and with a cooling water controlling system including a radiator and a heating system, the radiator being provided with a shutter unit and having supply and return connections to the engine, the return connection including a circulating pump, the heating system including a heat transfer unit and feed and return connections therefor to the supply connection of said radiator, there being a manually controlled valve between said feed and return connections so that when such valve is closed the engine cooling water is by-passed to the heating system, means for controlling said shutter unit including a thermostatic unit subject to the temperature of the return water of said heating system, said controlling means closing said shutter unit when the temperature of said return water falls below a predetermined point, an exhaust heating unit operatively associated with said feed connection of said heating system and with said engine, a valve controlling the delivery of exhaust to said exhaust heating unit, and means for controlling said valve including a thermostatic unit subject to the temperature of the water in the heating system, said last named controlling means opening said last named valve to admit exhaust to said exhaust heating unit when the temperature of the water in the heating system falls below a predetermined point.

7. The combination with a water cooled internal combustion engine provided with an exhaust pipe and with a cooling water controlling system including a radiator and a heating system, the radiator being provided with a shutter unit and having supply and return connections to the engine, the heating system including a heat transfer unit and feed and return connections therefor to the engine and radiator respectively, means for controlling said shutter unit including a thermostatic unit subject to the temperature of the return water of said heating system, said controlling means closing said shutter unit when the temperature of said return water falls below a predetermined point, an exhaust heating unit operatively associated with said feed connection of said heating system and with said engine, a valve controlling the delivery of exhaust to said exhaust heating unit, and means for controlling said valve including a thermostatic unit subject to the temperature of the water in the heating system, said last named controlling means opening said last named valve to admit exhaust to said exhaust heating unit when the temperature of the water in the heating system falls below a predetermined point.

8. The combination with a water cooled internal combustion engine, of a cooling water controlling system including a radiator and a heating system, the radiator being provided with a shutter unit and having supply and return connections to the engine, the return connection including a circulating pump, the heating system including a heat transfer unit and feed and return connections therefor to the engine and said radiator, respectively, a pneumatic control means for said shutter, a thermostatically actuated control valve for said shutter control means, the thermostatic element of which is subject to the temperature of the return water of said heating system, said thermostatically actuated control valve admitting air to said pneumatic control means when the temperature of the return water falls below a predetermined point, said pneumatic control means thus closing said shutter unit, an exhaust heating unit operatively associated with the engine and with said feed connection of said heating system, a valve controlling said exhaust heating unit, a pneumatic control means for said valve, a control valve for said second pneumatic control means, and thermostatic means responsive to the temperature of the water in the feed connection for the heating system for actuating said last named control valve, said last named control valve admitting air to said second pneumatic control means when the temperature of the water in the feed connection falls below a predetermined point, said second pneumatic control means thus opening said exhaust heating unit control valve to admit exhaust to said heating unit.

9. The combination with a water cooled internal combustion engine, of a cooling water controlling system including a radiator and a heating system, the radiator being provided with a shutter unit and having supply and return connections to the engine, the heating system including a heat transfer unit and feed and return connections therefor to the engine and radiator; a pneumatic control means for said shutter, a thermostatically actuated control valve for said shutter control means, the thermostatic element of which is subject to the temperature of the return water of said heating system, said thermostatically actuated control valve admitting air to said pneumatic control means when the temperature of the return water falls below a predetermined point, said pneumatic control means thus closing said shutter unit, an exhaust heating unit operatively associated with the engine and with said feed connection of said heating system, a valve controlling said exhaust heating unit, a pneumatic control means for said valve, a control valve for said second pneumatic control means, and means responsive to the temperature of the water in the feed connection for the heating system, to actuate said last named control valve when the temperature of said feed water falls below a predetermined point and admit air to said second pneumatic control means, said second pneumatic control means thus opening said exhaust heating unit control valve to admit exhaust to said heating unit.

10. The combination with a water cooled internal combustion engine, of a cooling water controlling system including a radiator and a heating system, the radiator being provided with a shutter unit and having supply and return connections to the engine, the return connection including a circulating pump, the heating system including a heat transfer unit and feed and return connections therefor to the engine and said radiator, respectively, a control means for said shutter including a thermostatic element which is subject to the temperature of the return water of said heating system, an exhaust heating unit operatively associated with the engine and with the heating system, and control means for said heating unit including a thermostatic element responsive to the temperature of the feed water for said heating system between said engine and said heat transfer unit, said last named control means admitting exhaust to said heating unit when the temperature of said feed water falls below a predetermined point.

11. The combination with a water cooled internal combustion engine, of a cooling water controlling system including a radiator and a heating system, the radiator being provided with a shutter unit and having supply and return connections to the engine, the heating system including a heat transfer unit and feed and return connections therefor, a control means for said shutter including a thermostatic element which is subject to the temperature of the return water of said heating system, said control means closing said shutter unit when the temperature of the return water falls below a predetermined point, an exhaust heating unit operatively associated with the engine and with the heating system, and a control means for said heating unit including a thermostatic element responsive to the temperature of the feed water for said heating system between said engine and said heat transfer unit, said last named control means admitting exhaust to said heating unit when the temperature of said feed water falls below a predetermined point.

12. The combination with a water cooled internal combustion engine, of a cooling water controlling system including a radiator and a heating system, the radiator being provided with a shutter unit and having supply and return connections to the engine, the return connection including a circulating pump, the heating system including a heat transfer unit and feed and return connections therefor to the engine and said radiator, respectively, a control means for said shutter including a thermostatic element which is subject to the temperature of the return water of said heating system, said control means closing said shutter unit when the temperature of the return water falls below a predetermined point, an exhaust heating unit, and a control means for said heating unit including a thermostatic element responsive to the temperature of the feed water for said heating system between said engine and said heat transfer unit, said last named control means admitting exhaust to said heating unit when the temperature of said feed water falls below a predetermined point.

13. The combination with a water cooled internal combustion engine provided with an exhaust pipe, a heating system including a heat transfer unit and feed and return connections therefor to the engine, a supply of air under pressure and a pipe connected thereto, an exhaust heating drum operatively associated with the feed connection of said heating system in advance of the heat transfer unit, supply and discharge connections for said heating drum to said exhaust pipe, a valve controlling said heating drum supply connection adapted when opened to direct products of combustion from the exhaust pipe to the drum, an air engine operatively associated with said heating drum control valve and connected to said air supply pipe, said engine opening said heating drum control valve when air is admitted to the engine from said pipe, and a thermostatically actuated control valve between said air engine and said air supply pipe including a thermostatic element subject to the temperature of the water in the heating system feed connection in advance of said heating drum, said element actuating said thermostatically controlled valve to admit air to said engine when the temperature of said water falls below a predetermined point.

14. The combination with an internal combustion engine provided with an exhaust pipe, a heating system including a heat transfer unit and feed and return connections therefor to the engine, a supply of air under pressure and a pipe connected thereto, an exhaust heating drum operatively associated with said heating system, supply and discharge connections for said heating drum to said exhaust pipe, a valve controlling said heating drum supply connection adapted when opened to direct products of combustion from the exhaust pipe to the drum, an air engine operatively associated with said heating drum control valve and connected to said air supply pipe, said engine opening said heating drum control valve when air is admitted to the engine from the pipe, and a thermostatically actuated control valve between said air supply pipe and said air engine including a thermostatic element subject to the temperature of the heating medium in the heating system directly in advance of said heating drum, said element actuating said thermostatically controlled valve to admit air to said engine when the temperature of the heating medium falls below a predetermined point.

15. The combination with a water cooled internal combustion engine provided with an exhaust pipe, a heating system including a heat transfer unit and feed and return connections therefor to the engine, an exhaust heating drum operatively associated with the feed connection of said heating system in advance of said heat transfer unit, supply and discharge connections for said heating drum to said exhaust pipe, a valve controlling said heating drum supply connection adapted when opened to direct products of combustion from the exhaust pipe to the drum, operating means operatively associated with said heating drum control valve including a thermostatic element subject to the temperature of the water in the heating system directly in advance of said heating drum, said element causing said operating means to open said drum controlling valve when the temperature of the water falls below a predetermined point, and manually operable means for by-passing substantially all of the cooling water for said engine through said heating system when desired.

16. The combination with a water cooled internal combustion engine, of a heating system including a heat transfer unit and feed and return connections therefor to the engine cooling system, an exhaust heating unit operatively associated with said feed connection of said heating system and with the engine exhaust, a valve controlling the delivery of exhaust to said heating unit, means for controlling said exhaust heating unit valve including a thermostatic unit subject to the temperature of the water in the heating system feed connection in advance of said heating drum, said thermostatic unit causing said controlling means to actuate said valve to admit exhaust to said heating unit when the temperature of said water falls below a predetermined point, and manually operable means for by-passing substantially all of the engine cooling water through said heating system when desired.

17. The combination with a water cooled internal combustion engine, of a heating system including a heat transfer unit and feed and return connections therefor to the engine cooling system, an exhaust heating unit operatively associated with said feed connection of said heating system and with the engine exhaust, means for controlling said exhaust heating unit including a thermostatic unit subject to the temperature of the water in said heating system in advance of said heating unit, said controlling means admitting exhaust to said heating unit when the temperature of the water at said thermostatic unit falls below a predetermined point, and means for by-passing substantially all of the cooling water for said engine through said heating system.

18. The combination with a water cooled internal combustion engine, of a cooling water controlling system including a radiator, a heating system and a shutter unit for said radiator, a control means for said shutter including a thermostatic device subject to the return water of said heating system, said control means closing the shutter unit when the temperature of the return water falls below a predetermined point, an exhaust heating unit operatively associated with the engine and with said heating system, and a control means for said exhaust heating unit including a thermostatic device subject to the temperature of the feed water of the heating system, said last named control means admitting exhaust to said heating unit when the temperature of said feed water falls below a predetermined point.

19. The combination with a water cooled internal combustion engine, of a cooling water controlling system including a radiator, a shutter unit therefor, and a heating system, and a control means for said shutter unit including a thermostatic device subject to the temperature of the return water of said heating system, said control means closing the shutter unit when the temperature of said return water falls below a predetermined point.

20. The combination with an internal combustion engine provided with an exhaust pipe, of a heating system including a heat transfer unit and feed and return connections therefor to the engine, a supply of air under pressure, an exhaust heating drum operatively associated with said heating system, supply and discharge connections for said heating drum to said exhaust pipe, a valve controlling said heating drum supply connection adapted when open to direct products of combustion from the exhaust pipe to the drum, and thermostatically actuated control means for said valve including a thermostatic element subject to the temperature of the heating medium in the heating system directly in advance of said heating drum, said control means opening said valve to admit products of combustion to said drum when the temperature of the heating medium at said element falls below a predetermined point.

WALTER A. KYSOR.